March 9, 1965   W. J. NEWILL   3,173,043
CONVERTIBLE ELECTRICAL MACHINE
Filed Jan. 8, 1962   4 Sheets-Sheet 1
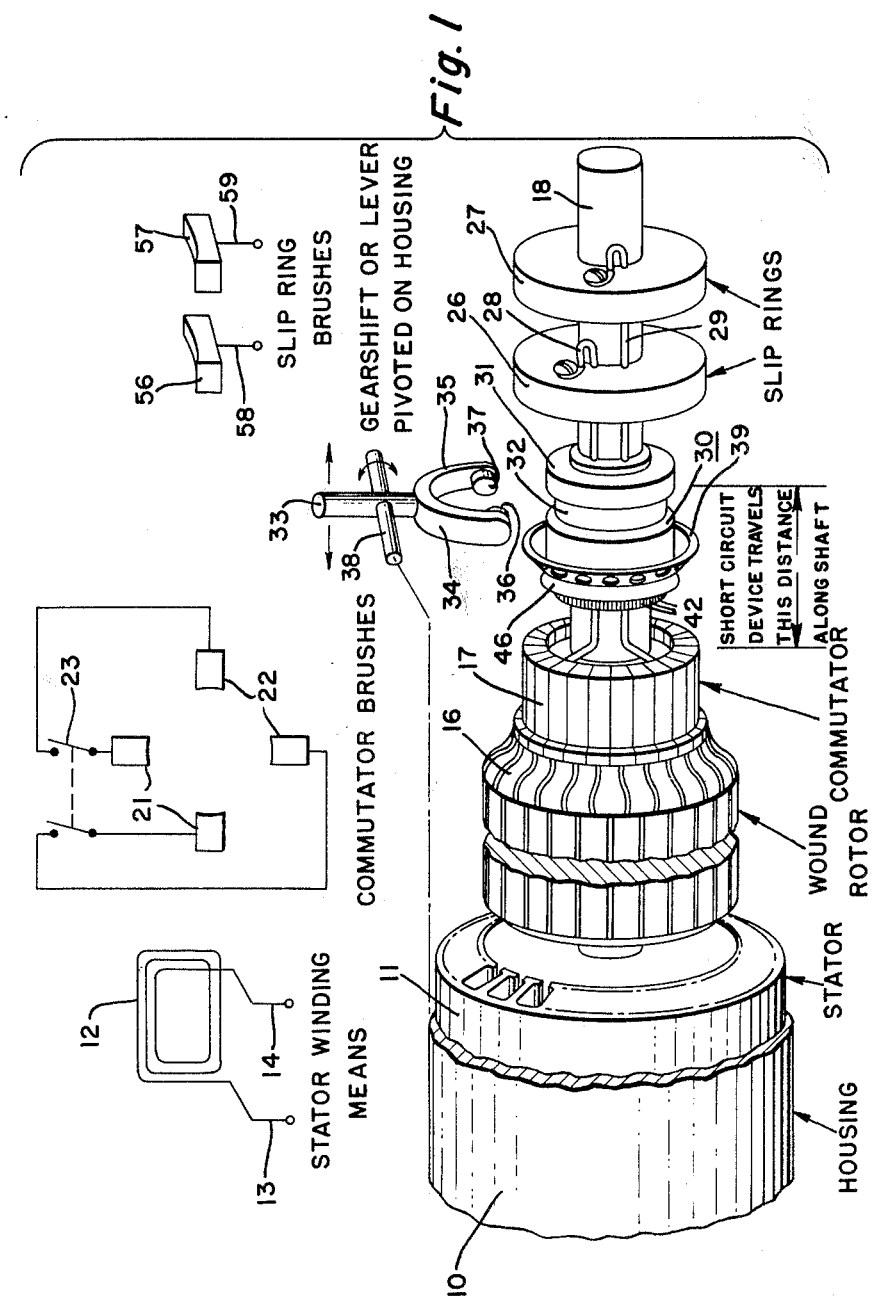
INVENTOR.
William J. Newill
BY
Albert H. Reuther
His Attorney March 9, 1965  W. J. NEWILL  3,173,043
CONVERTIBLE ELECTRICAL MACHINE
Filed Jan. 8, 1962  4 Sheets-Sheet 2

INVENTOR.
William J. Newill
BY
*Albert H. Reuther*
His Attorney

INVENTOR.
William J. Newill
BY
Albert H. Reuther
His Attorney

United States Patent Office 3,173,043
Patented Mar. 9, 1965

3,173,043
CONVERTIBLE ELECTRICAL MACHINE
William J. Newill, Spring Valley, Ohio, assignor to General Motors Corporation, Detroit, Mich., a corporation of Delaware
Filed Jan. 8, 1962, Ser. No. 164,694
10 Claims. (Cl. 310—128)

This invention relates to electrical machinery and, more particularly, to conversions of a repulsion induction motor into a generator.

An object of this invention is to provide a new and improved multi-purpose electrical machine having components to facilitate conversion of shared use of combination unit features for inexpensive realization of advantages of differing modes of operation.

Another object of this invention is to provide a con-vertical electrical machine operable both as a repulsion-innduction motor and as a rotating-field stand-by A.-C. generator for less cost than that of two equivalent machines while adapting a single machine to require only limited additional components such as an axially shiftable short circuiting device and "gearshift" or yoke means as well as provision of additional slip rings connected to commutator segments in predetermined locations.

Another object of this invention is to provide for conversion of a repulsion-induction motor means having high starting torque at low starting current for use as a rotating field alternating current generator means by addition of a limited number of components including a "gearshift" or yoke means to shift an angular short circulating device into and out of engagement with a commutator bar means carried on a shaft adjacent to a wound rotor as well as a pair of slip rings also carried by the shaft and adapted to receive D.-C. excitation for a rotating field A.-C. generator, the short circuiting device being movable axially along the shaft to one position to effect possible commutator shorting and connection of the brushes to each other during motor running operation while during operation as a generator, the slip rings can transmit direct current power from a battery or source as the shaft is driven by a prime mover such as a windmill, an internal combustion engine as well as a motor-powered vehicle including a tractor with power take-off and the like so that A.-C. power becomes available from stator windings of the machine.

A further object of this invention is to provide a repulsion-induction motor to which slip rings are added with a "gearshift" or yoke means journalled to effect axial movement of a short circuiting device away from a shaft-mounted commutator so that armature brushes in predetermined positions substantially 90° apart on the commutator can have connections thereto open while slip ring brushes are used to supply power through lead means to commutator segments or bars generally 90° apart for D.-C. energization of armature windings as a rotating field during external driving of the armature shaft for generation of A.-C. power in stator field windings of the machine useful for emergency and stand-by supply of power during interruption of power as well as in rural areas.

Another object of this invention is to provide components for conversion of a repulsion-induction motor into an A.-C. generator and vice versa including in combination a housing and stator field winding, a wound rotor and commutator bar or segment means carried on a shaft journalled in the housing in a location substantially radially in alignment with the stator field winding, armature brushes having leads thereto for switched connection to each other at locations substantially 90° apart during motor operation and opening of circuit connection of armature brushes during generator operation when a pair of slip ring means and brushes therewith are connected to a D.-C. source of power for energization of the wound rotor through leads from the slip ring means to the commutator means during positive axial shifting of an angular short circuiting device along the shaft to a position away from the commutator means through the short circuiting device is provided with radially movable and resiliently biased weight portions for use during repulsion-induction motor operation of the machine as power is supplied to the stator field winding from an A.-C. power source and the slip ring connections are out of use and the short circuiting device is shifted on the shaft to a position wherein the weight portions are radially aligned with the commutator means.

Further objects and advantages of the present invention will be apparent from the following description, reference being had to the accompanying drawings wherein a preferred embodiment of the present invention is clearly shown.

In the drawings:

FIGURE 1 is an exploded view of components for a convertible electrical machine in accordance with the present invention.

Figure 3:
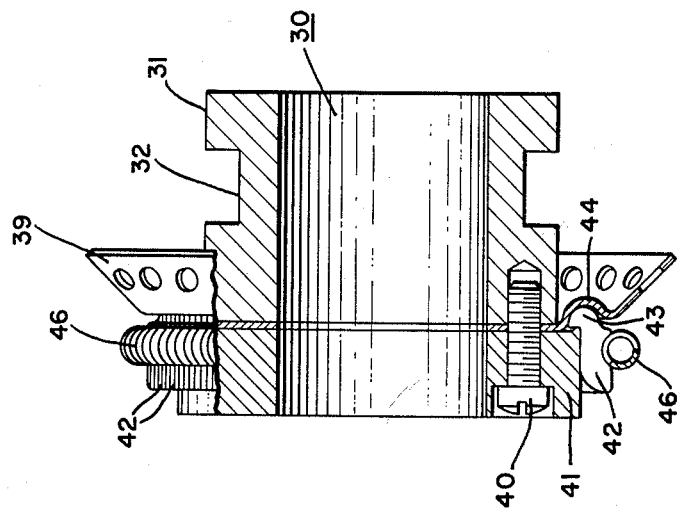
FIGURE 3 is a sectional view taken along line 3—3 in FIGURE 2.

A need exists for stand-by or emergency generator equipment in various urban and rural areas where electric power may not be available or can be interrupted due to stormy weather as well as possible failure of electrical transmission equipment. A prime mover such as a windmill, an internal combustion engine as well as a motor-powered vehicle including a tractor with a power take-off or pulley-belt drive and the like can generally be found. However, it has not always been practical to have available for a minimum cost a convertible electrical machine adapted to provide advantages of a repulsion-induction motor which could be used as a stand-by generator. Now, by providing a convertible electrical machine in accordance with the present invention, it is possible in the event of a power failure or outage for such a stand-by generator to be used to supply a moderate amount of stand-by power though utilizing the same machine which normally can be used as a repulsion-induction or "RI" motor adapted to provide a high starting torque with a low starting current. In accordance with the present invention such convertible electrical machine can be constructed for less cost than two separate equivalent machines. Such a convertible electrical machine is particularly practical for customers who may not want to make a large investment in a stand-by generator. Appeal to price-conscious buyers who use mail-order houses as a source of equipment used by them is a factor to consider along with particular electrical advantages and operating characteristics.

FIGURE 1 provides an exploded view of components for a convertible electrical machine which includes a housing 10 surrounding a magnetic stator core means 11 having slots into which stator winding means 12 having lead wires 13 and 14 connected thereto can be placed. In addition, the electrical machine includes a wound armature or rotor portion 16 located adjacent to and electrically connected with segments or bars of a commutator portion 17. This armature or rotor portion and commutator portion can be carried by a shaft means 18 journalled for rotation in the frame or housing 10 of the electrical machine. Armature brush means 21 and 22 are provided to engage outer peripheral surfaces of the conductor bars or segments of the commutator portion 17. A switch means 23 can be provided for opening and closing of electrical connections between brush means as will be described in further detail for operation in accordance with the present invention.

FIGURE 1 also illustrates additional components provided on the shaft means 18 and directed to use of this electrical machine as a repulsion-induction motor means as well as a rotating field A.-C. generator means. In accordance with the present invention, a pair of angular slip ring means 26 and 27 are also mounted directly on the shaft means 18. As illustrated in FIGURE 1, a lead wire 28 interconnects one of the conductor bars or segments of the commutator portion 17 with one of the slip ring means 26 and another lead wire suitably insulated and indicated by numeral 29 interconnects a differing commutator bar or segment with slip ring means 27. These lead wires 28 and 29 are insulated from the shaft means 18 as well as from a short circuiting device generally indicated by numeral 30. The slip rings 26 and 27 are connected to commutator bars or segments of the commutator portion 17 in locations substantially 90° apart as indicated in FIGURE 1.

The short circuiting device 30 includes an angular body portion 31 having a radially inwardly extending recess or groove 32 adjacent to one end thereof. A "gearshift" or lever-like yoke means 33 having a pair of semi-angular extensions 34 and 35 terminating in pins or projections 36 and 37, respectively, extending into the recess or groove 30 can be pivotally mounted by a pivot 38 relative to the housing 10. This "gearshift" or lever means 33 can effect axial shifting of the short circuiting device 30 into differing longitudinally spaced positions along the shaft means 18. The short circuiting device 30 is movable axially or longitudinally along the shaft means 18 in space between the commutator portion 17 and one of the slip ring means 26–27.

Figure 2:
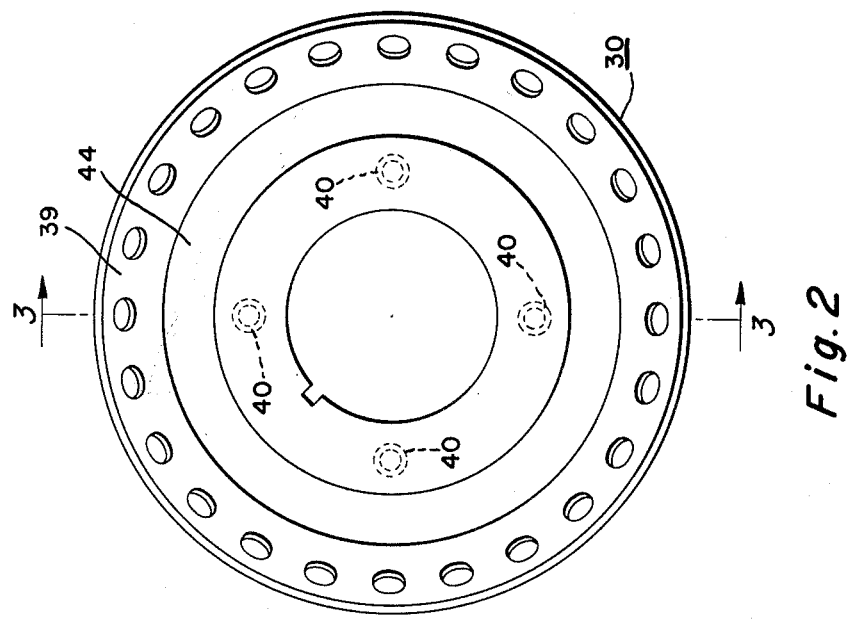
FIGURE 2 is an end view of an axially-shiftable angular short circuiting device for use in accordance with the present invention.

As can be seen in views of FIGURES 1, 2 and 3 the short circuiting device 30 having the axially shiftable angular body portion 31 has a conically shaped plate means 39 secured to the body portion 31 on one side thereof by a fastening means such as screws 40 which fit through suitable openings in an angular end stop member 41 adapted to be held to the body portion 31 for axial to and fro movement therewith as determined by positioning of the "gearshift" or lever means 33. The short circuit device 30 includes a plurality of pivotally mounted weight portions 42 having integral pivot ends 43 retained in a cavity or socket formed by an angular bead or deformation 44 integral with the generally conical plate member 39 as illustrated in FIGURE 3. A resilient angular retainer or garter spring means 46 is located in a coil radially outside the weight portions 42 which are biased against an outer periphery of the stop member 41 under urging of this resilient spring means 46. Centrifugal force of the weight means or pivotal portions 42 against the bias of the resilient garter spring means 46 can occur such that ends of the weight portions 42 remote from the pivotal end 43 thereof can engage inner peripheral surfaces of conductor bars or segments of the commutator portion 17 in the event the short circuit device is positioned adjacent to and substantially radially in alignment with ends of the conducting bars or segments of the commutator portion 17 for operation of the convertible electric machine as a repulsion-induction motor means.

Figure 4:
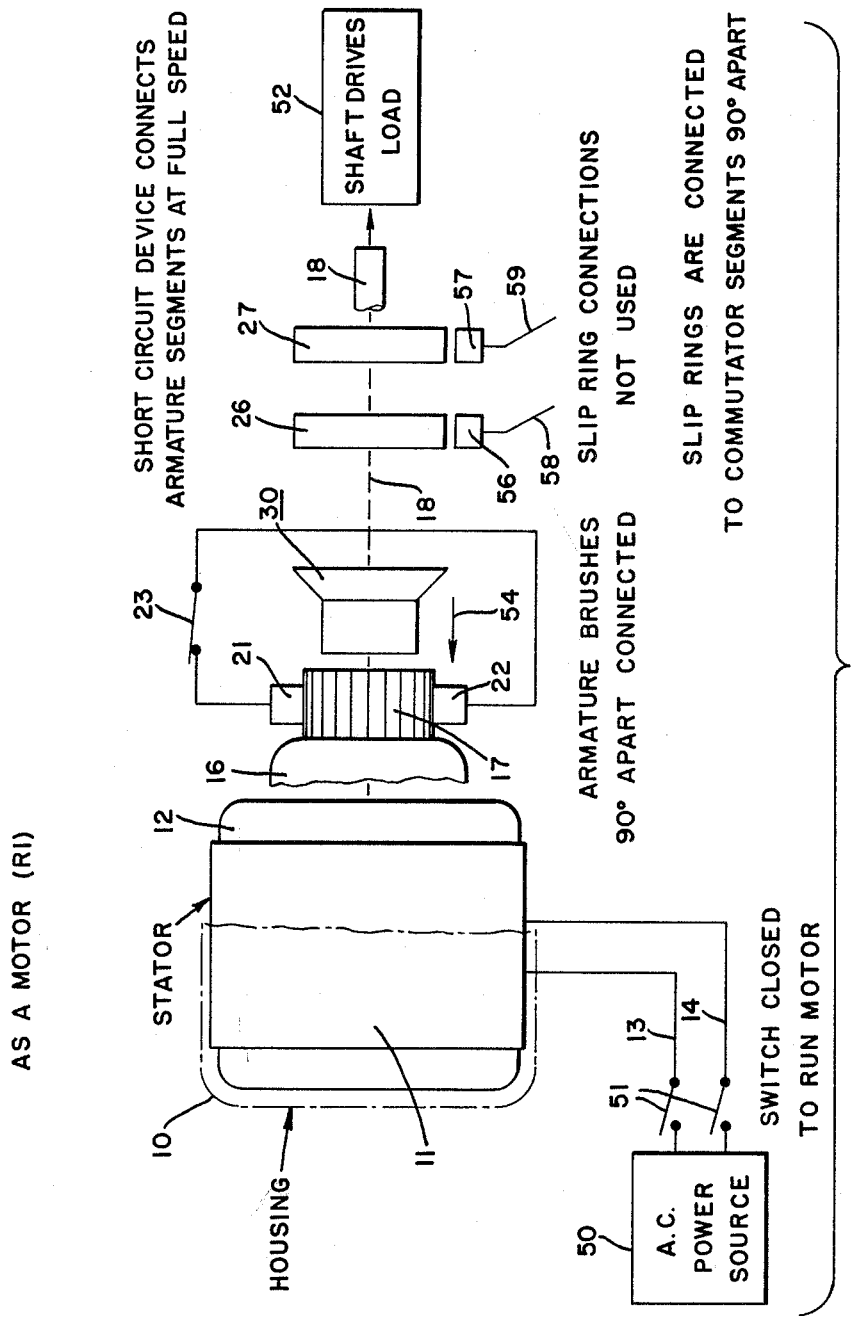
FIGURE 4 is a schematic diagram of arrangement and connection of components for operating use of the machine as a repulsion-induction motor.

FIGURE 4 provides a schematic diagram of arrangement and connection of components for operating use of the convertible electrical machine as a repulsion-induction motor means. A suitable A.-C. power source 50 can be connected through switch means 51 to lead wires 13 and 14 for energization of the stator winding means 12. Shaft means 18 can drive a load 52 and the "gearshift" or lever means 33 of FIGURE 1 with the projections 36 and 37 thereof in the recess or groove 32 of the body portion 31 of the short circuiting device 30 of FIGURES 1, 2 and 3 can be used to effect axial shifting of the short circuiting device 30 in the direction indicated by an arrow 54 in FIGURE 4 such that the weight portions 42 can short circuit or connect conducting bars or segments of the commutator portion 17 at full speed. During use as a repulsion-induction motor means the switch means 23 is closed to effect interconnection of the brush means 21–22 as indicated in FIGURE 4. The slip ring means 26 and 27 have brushes 56 and 57, respectively, electrically engageable thereon with electrical connecting leads 58 and 59 therewith though not in use for operation as a repulsion-induction motor means. Thus, the convertible electric machine can be caused to operate with high starting torque at a low starting current subject to connection of armature segments at full speed due to radially outward shifting of the weight portions 42 of the short circuiting device 30 as positioned immediately adjacent and engageable with the conducting bars or segments of the commutator portion 17.

Figure 5:
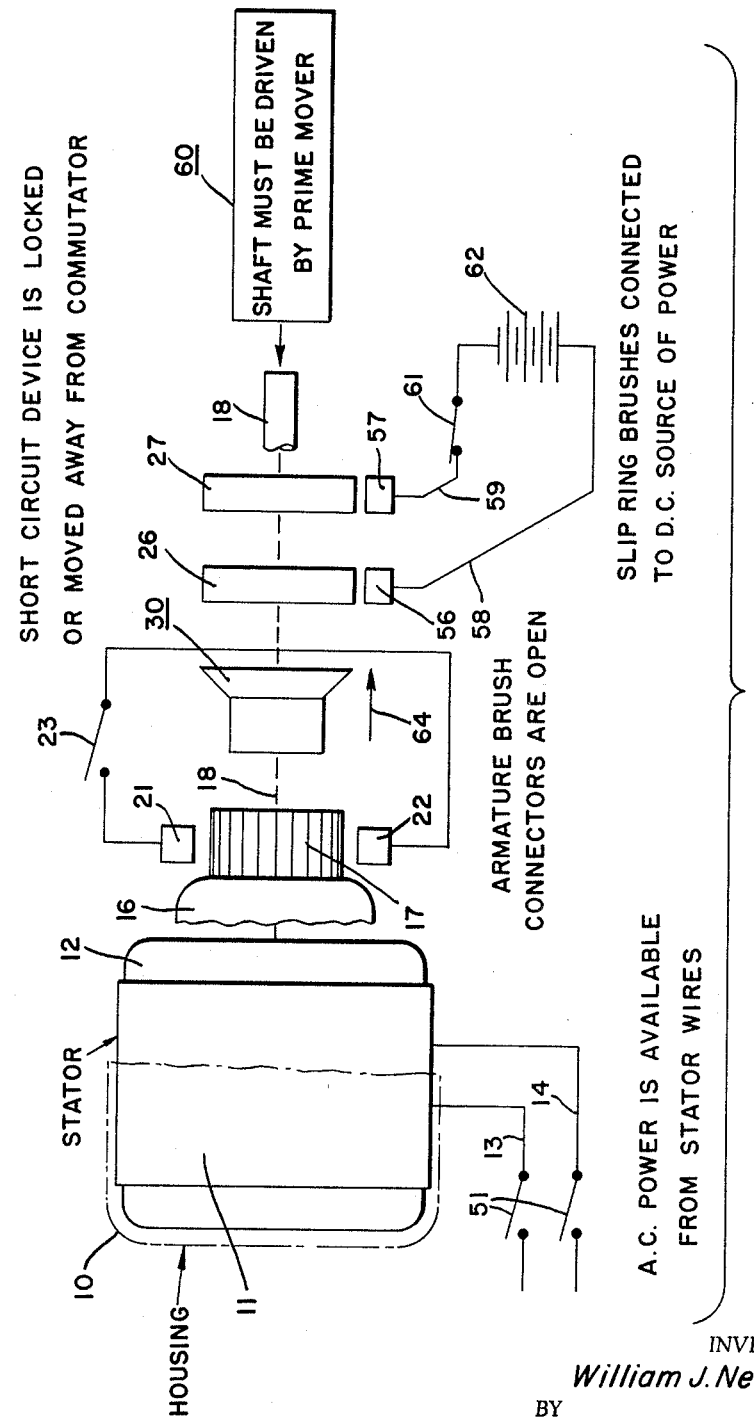
FIGURE 5 is a schematic diagram of arrangement and connection of components for operating use of the machine as an A.-C. generator.

FIGURE 5 is a schematic diagram of arrangement and connection of components for operating use of the convertible electrical machine as an A.-C. generator means. The shaft means 18 must now be driven by a prime mover generally indicated by numeral 60 which can be a windmill, internal combustion engine and the like. A switch means 61 is provided to connect a D.-C. power source 62 such as a battery and the like to the lead wires 58–59 connected to the slip ring brush means 56–57, respectively. The "gearshift" lever or yoke means is used to shift the short circuiting device 30 in a direction indicated by an arrow 64 to a position away from the commutator portion 17. The "gearshift" lever or yoke means can be locked or latched into a position so as to maintain the short circuiting device 30 in a position away from the commutator portion 17. The switch means 23 is open as indicated in FIGURE 5 so that the armature brush means 21–22 are disconnected from each other. During A.-C. generator operation of the convertible electrical machine direct current energy is supplied from the D.-C. power source 62 by way of the slip ring brushes 56–57 and slip ring means 26–27 to the lead wires 28–29 connected to commutator segments substantially 90° apart for energization of the wound armature or rotor portion 16 on the shaft means 18 driven by the prime mover 60 so as to cause generation of A.-C. power available from the stator lead wires 13 and 14 dependent upon positioning of the switch means 51.

The wound armature of the convertible electric machine is adapted for use as a rotating D.-C. excited field during generator operation and also as a squirrel-cage rotor winding due to shorting of commutator bars or segments at a predetermined speed for operation as a single phase induction motor. Advantages of high starting torque together with low starting current can also be realized. The entire convertible electrical machine can be provided in a compact unit which can serve dual purposes without need for having separate pieces of equipment some of which would not be in demand for use except in cases of emergency. Large investment for a stand-by generator can be avoided and a repulsion-induction motor means can be readily converted for use as an A.-C. generator by provision of components and features in accordance with the present invention.

While the embodiments of the present invention as herein disclosed constitute a preferred form, it is to be understood that other forms might be adopted.

What is claimed is as follows:

1. A convertible electrical machine, comprising, a housing portion, stator core and winding means energizable as mounted inside said housing portion, a wound armature and brush-commutator portion carried by shaft means journalled for rotation inside said housing portion, slip ring and brush means therefor carried on said shaft means in a location to one side of said brush-commutator portion, and a shiftable short-circuit device movable axially on said shaft means into locations both substantially radially in alignment with as well as axially adjoining said brush-commutator portion and also radially and axially remote from said brush-commutator portion whereby said short-circuit device when radially in alignment can engage said brush-commutator portion to form a wound-armature squirrel-cage connection during operation as a motor and whereby said short-circuit device is remote from said brush-commutator portion when said slip ring and brush means can effect transfer of energizing power to said wound armature and brush-commutator portion as a rotating field during operation as a rotating-field stand-by A.-C. generator.

2. The machine of claim 1 wherein said short-circuit device is engaged by lever means for to and fro shift thereof axially along said shaft means.

3. The machine of claim 1 wherein said short-circuit device includes an angular body portion having an angular groove extending radially therein, a substantially conically-shaped plate member having an angular recess-forming portion, weight means pivotally journalled in said recess-forming portion, angular resilient means biasing said weight means radially inwardly up to a predetermined speed, and a lever means with a radially inwardly projecting yoke portion to engage said body portion along said angular groove thereof for shifting of said short-circuit device to and fro axially along said shaft means for selective and distinctive motor-generator operation.

4. A convertible electrical machine operable both as a repulsion-induction motor and as a rotating-field stand-by A.-C. generator, comprising, a housing portion, stator core and winding means energizable inside said housing portion, a wound armature and brush-commutator portion carried by shaft means journalled for rotation within said housing portion, an axially shiftable short circuiting device on said shaft means and movable to and fro into position either substantially radially in alignment with as well as axially adjoining said brush-commutator portion and axially remote away from possible radial alignment with said brush-commutator portion, slip ring and brush means thereof located along said shaft means at a predetermined distance from said wound armature and brush-commutator portion electrically connected thereto, and a "gearshift" means pivotally journalled in said housing portion and engageable to shift said short circuiting device into alternate positions respectively for motor as well as stand-by A.-C. generator operation.

5. The machine of claim 4 wherein a pair of insulated wire leads interconnect said slip ring means with a predetermined pair of commutator portion segments substantially 90° apart, said wire leads extending axially along said shaft means over which said short circuiting device is movable due to actuation by said "gearshift" means.

6. In combination on a convertible electrical machine operable both as a repulsion-induction motor and as a stand-by A.-C. generator, wound stator means and a wound armature including a shaft journalled to permit rotation thereof relative to said stator means, a brush-commutator portion carried on said shaft, a pair of slip ring and brush means as well as an axially shiftable short-circuiting device movable to and fro on said shaft for a predetermined distance between said brush-commutator portion and said pair of slip ring and brush means, said short-circuiting device when positioned immediately adjacent to and substantially radially in alignment with said brush-commutator portion being usable for repulsion-induction motor operation to short circuit said brush-commutator portion above a predetermined speed to interconnect said wound armature as a squirrel-cage rotor though below said predetermined speed a high starting torque at low starting current can be realized, said short circuiting device being shiftable into a position radially out of alignment and axially away from said brush-commutator portion while said pair of slip ring and brush means serve to supply power to said brush-commutator portion for D.-C. energization of said wound armature as a rotating field during external driving of said shaft for generation of A.-C. power in said wound stator means.

7. Components of an electrical machine for conversion of a repulsion-induction motor into an A.-C. generator and vice versa, comprising, in combination, a housing and stator field winding means, a wound rotor and commutator segment means carried on a shaft journalled in said housing in a location substantially radially in alignment with said stator field winding means, armature brushes having leads thereto for switched connections to each other at locations substantially 90° apart during motor operation and opening of circuit connection of said armature brushes during A.-C. generator operation, a pair of slip ring means and brushes therewith connectable to a D.-C. power source for energization of said wound rotor through leads from said slip ring means to said commutator segment means, and an angular short circuiting means axially shiftable along said shaft to a position either substantially radially in alignment with said commutator segment means for motor operation as well as axially away from said commutator segment means for generator operation during connection of said slip ring means to the D.-C. power source for energization of said wound rotor and generation of A.-C. power in said stator field winding means.

8. On a convertible electrical machine operable as an A.-C. generator as well as a repulsion-induction motor having a stator field winding means and wound armature with a plurality of commutator conducting bars on a rotatable shaft, limited additional components for such alternate operation, comprising, a pair of shaft-mounted slip ring means and brushes thereon for D.-C. energization of the wound armature during generator operation, an axially shiftable short circuiting means positioned radially out of alignment and axially away from the commutator bars during operation as an A.-C. generator though positioned axially adjacent thereto and substantially during operation as a repulsion-induction motor, and actuator means to effect axial shift of said short circuiting means into positively differing positions.

9. The components of claim 8 wherein said short circuiting means includes a plurality of pivotal weight portions normally resiliently biased to a non-shorting position though deflectable to a shorting position at a predetermined speed, and a pair of insulated conductor connections joined at one end thereof to a predetermined pair of commutator bars substantially 90° apart and joined at an opposite end to said slip ring means for electrical energization of the wound armature when said short-circuiting means is positioned radially out of alignment and axially away from the commutator bars during operation as an A.-C. generator.

10. In a convertible electrical machine having a housing portion, stator core and winding means energizable as mounted inside the housing portion as well as a wound armature and brush-commutator portion carried by shaft means journalled for rotation inside the housing portion, though also carrying slip ring and brush means in a location axially to one side of the brush-commutator portion, the combination therewith of a shiftable short-circuit device movable axially on the shaft means into purposely differing locations in one of which said short-circuit device is generally radially in alignment with as well as axially immediately adjacent to the brush-commutator portion for machine operation as a repulsion-induction motor per se and in another of which said short-circuit device is both radially and axially away from possible engagement as to the brush-commutator portion such that the slip ring and brush means can effect transfer of energizing power to the brush-commutator portion and wound armature as a rotating field during machine operation as an A.-C. generator per se.

References Cited by the Examiner
UNITED STATES PATENTS

| | | | |
|---|---|---|---|
| 875,923 | 2/08 | Wood | 310—128 XR |
| 2,465,195 | 3/49 | Brown | 318—196 XR |

M. O. HIRSHFIELD, *Primary Examiner*.